United States Patent [19]

Harwood et al.

[11] Patent Number: 5,344,902
[45] Date of Patent: Sep. 6, 1994

[54] POLYMERIZATION WITH INITIATOR AND QUATERNARY AMMONIUM SALT

[75] Inventors: H. James Harwood, Stow; Daniel H. Jones, Akron, both of Ohio; Andrew W. Talkington, Encino, Calif.; Stephen D. Goodrich, Akron, Ohio

[73] Assignee: Occidental Research Corporation, Los Angeles, Calif.

[21] Appl. No.: 982,835

[22] Filed: Nov. 30, 1992

Related U.S. Application Data

[63] Continuation of Ser. No. 716,938, Jun. 18, 1991, abandoned.

[51] Int. Cl.$^5$ ............ C08F 4/34; C08F 216/36; C08F 220/10; C08F 216/12
[52] U.S. Cl. .................... 526/217; 526/227; 526/230; 526/316; 526/328.5; 526/332
[58] Field of Search .......... 526/217, 227, 230, 316, 526/328.5, 332

[56] References Cited

U.S. PATENT DOCUMENTS

| | | | |
|---|---|---|---|
| Re. 31,165 | 3/1983 | Serini et al. | 525/67 |
| 2,445,536 | 7/1948 | Parsons et al. | 526/314 |
| 2,516,155 | 7/1950 | Slack | 32/17 |
| 2,606,881 | 8/1952 | Zief et al. | 260/17.4 |
| 2,733,156 | 1/1956 | Cornell et al. | 106/38.5 |
| 2,733,157 | 1/1956 | Cornell et al. | 106/38.5 |
| 2,833,741 | 5/1958 | Lal | 260/45.5 |
| 2,833,753 | 5/1958 | Lal | 260/89.5 |
| 2,873,263 | 2/1959 | Lal | 260/45.4 |
| 2,877,205 | 3/1959 | Lal | 260/45.5 |
| 2,877,208 | 3/1959 | Lal | 260/45.5 |
| 2,916,469 | 12/1959 | Lal | 260/41 |
| 2,946,770 | 7/1960 | Bäder et al. | 526/217 |
| 2,947,716 | 8/1960 | Cornell et al. | 260/41 |
| 2,964,501 | 12/1960 | Sarofeen | 260/77.5 |
| 3,005,801 | 10/1961 | Erickson et al. | 260/78.4 |
| 3,012,287 | 12/1961 | Tucker | 18/55.1 |
| 3,250,813 | 5/1966 | Stephenson | 260/614 |
| 3,268,484 | 8/1966 | Costanza et al. | 260/77.5 |
| 3,277,064 | 10/1966 | Lovelock et al. | 260/87.1 |
| 3,380,980 | 4/1968 | Calkins et al. | 260/89.5 |
| 3,485,809 | 12/1969 | Robert | 260/86.1 |
| 3,487,062 | 12/1969 | Bodycot | 260/89.5 |
| 3,488,846 | 1/1970 | Cornell | 32/8 |
| 3,751,378 | 8/1973 | Cowperthwaite et al. | 260/4 |
| 3,799,916 | 3/1974 | Langsam | 260/87.1 |
| 3,847,865 | 11/1974 | Duggins | 260/42.52 |
| 3,857,824 | 12/1974 | Atkins | 526/217 |
| 3,932,372 | 1/1976 | Lewis et al. | 260/92.8 W |
| 3,957,921 | 5/1976 | Iwahashi | 260/901 |
| 3,960,824 | 6/1976 | Hicks | 526/85 |

(List continued on next page.)

FOREIGN PATENT DOCUMENTS

| | | |
|---|---|---|
| 1146254 | 3/1963 | Fed. Rep. of Germany . |
| 1192683 | 8/1989 | Japan . |
| 1103947 | 2/1968 | United Kingdom . |

OTHER PUBLICATIONS

Miller, Koch and McLafferty, "Fluorine-sensitized Chlorination and Oxidation," J. Am. Chem. Soc., vol. 78, 4992–4995, 1956.

(List continued on next page.)

Primary Examiner—Joseph L. Schofer
Assistant Examiner—Wu C. Cheng
Attorney, Agent, or Firm—Harness, Dickey & Pierce

[57] ABSTRACT

An improved polymerization process wherein starting material such as monomer, a mixture of monomers, a partially polymerized product, or a mixture of fully polymerized product and monomer or monomer mixture is reacted with an initiator such as an organic peroxide, hydroperoxide or perester and a quaternary ammonium salt under polymerization conditions wherein polymerization or further polymerization of the starting material is initiated. The initiator and quaternary ammonium salt are miscible with the polymerization mixture in the absence of solvent. An improved polymerization process is also provided wherein a crosslinked polymer structure is formed from an unsaturated polymer in a polymerizable monomer.

9 Claims, No Drawings

U.S. PATENT DOCUMENTS

| | | | |
|---|---|---|---|
| 4,012,364 | 3/1977 | Farber | 260/77.5 D |
| 4,017,440 | 4/1977 | Killam | 526/217 |
| 4,051,214 | 9/1977 | Casper et al. | 264/137 |
| 4,058,656 | 11/1977 | Markiewitz et al. | 526/215 |
| 4,059,616 | 11/1977 | Lewis et al. | 526/66 |
| 4,100,140 | 7/1978 | Zahir et al. | 526/90 |
| 4,113,803 | 9/1978 | Price | 260/885 |
| 4,126,746 | 11/1978 | Hickner et al. | 544/219 |
| 4,133,793 | 1/1979 | Lewis et al. | 260/31.2 R |
| 4,148,949 | 4/1979 | Casper et al. | 417/391 |
| 4,150,237 | 4/1979 | Hickner et al. | 560/127 |
| 4,152,506 | 5/1979 | Novak | 526/224 |
| 4,159,301 | 6/1979 | Buser et al. | 264/331 |
| 4,210,565 | 7/1980 | Emmons | 260/29.6 TA |
| 4,214,064 | 7/1980 | Kanazawa | 526/193 |
| 4,249,011 | 2/1981 | Wendling | 548/312 |
| 4,260,564 | 4/1981 | Balocchi et al. | 264/2.2 |
| 4,262,072 | 4/1981 | Wendling et al. | 430/14 |
| 4,319,003 | 3/1982 | Gardland | 525/148 |
| 4,322,509 | 3/1982 | Zalucha | 525/287 |
| 4,326,049 | 4/1982 | Rasmussen | 526/91 |
| 4,351,931 | 9/1982 | Armitage | 526/227 |
| 4,413,089 | 11/1983 | Gavin et al. | 524/435 |
| 4,446,270 | 5/1984 | Guenther et al. | 524/433 |
| 4,506,062 | 3/1985 | Flesher et al. | 526/211 |
| 4,515,928 | 5/1985 | Schwarz | 526/200 |
| 4,528,351 | 7/1985 | Tarumi et al. | 526/314 |
| 4,588,798 | 5/1986 | Heitner | 526/228 |
| 4,742,133 | 5/1988 | Tang et al. | 526/235 |
| 4,743,654 | 5/1988 | Kyu et al. | 525/148 |
| 4,745,029 | 5/1988 | Kambour | 428/412 |
| 4,791,184 | 12/1988 | Nagai et al. | 526/323.2 |
| 4,841,016 | 6/1989 | Edwards | 528/272 |
| 4,873,269 | 10/1989 | Nakazato | 523/115 |
| 4,910,274 | 3/1990 | Priddy | 526/210 |
| 4,945,122 | 7/1990 | Edwards | 524/166 |
| 5,023,313 | 6/1991 | Edwards | 524/166 |
| 5,045,613 | 9/1991 | Edwards | 526/209 |
| 5,073,587 | 12/1991 | Edwards | 524/166 |
| 5,134,210 | 7/1992 | Edwards | 526/209 |

OTHER PUBLICATIONS

Poutsma, "Competition between Ionic and Free-Radical Reactions during Chlorination of Cyclohexene," J. Am. Chem. Soc., vol. 87, 2161–2171, 1965.

Walling and Padwa, "Effects of Structure and Medium on the β-Scission of Alkoxy Radicals," Organic and Biological Chemistry 85, 1593–1597, 1963.

Walling, Heaton, and Tanner, "'Spontaneous' Chain Initiation and the Reaction of t-Butyl Hypohalites with Acetylenes," Organic and Biological Chemistry 87, 1715–1721, 1965.

Walling and Mintz, "t-Butyl Hypochlorite Chlorination of Ethers, Aldehydes, and Other Molecules with Polar Substituents," J. Am. Chem. Soc., 89, 1515–1519, 1967.

Walling, "Some Aspects of the Chemistry of Alkoxy Radicals," Pure and Appl. Chem., 15, 69–80, 1967.

Tobolsky and Matlack, "Cumene Hydroperoxide–Initiated Radical Polymerization," J. Polym. Sci., 55, 49–56, 1961.

Uebrreiter and Rabel, "Die Beschleunigung des Hydroperoxydzerfalls durch Wasserstoffbrückenbildner in Lösung und bei der Polymerisation," Makromol. Chem., 68, 12–23, 1963.

Farkas and Passaglia, "The Decomposition of Cyclohexyl Hydroperoxide and the Peroxide-catalyzed Polymerization of Styrene," J. Am. Chem. Soc., 72, 3333–3337, 1950.

Walling and Heaton, "Hydrogen Bonding and Complex Formation in Solutions of t-Butyl Hydroperoxide," J. Am. Chem. Soc., 87, 48–51, 1965.

Walling and Heaton, "Radical Formation in the Reactions of t-Butyl Hydroperoxide with Styrene," J. Am. Chem. Soc., 87, 38–47, 1965.

Martin and Drew, "Oxygen-18 Labeling Studies on Reaction Yielding Cyclohexyl Acetate from Cyclohexene and Acetyl Peroxide," J. Am. Chem. Soc., 83, 1232–1237, 1961.

Lamb, Rogers, Dean and Voight, "The Intramolecular Reaction between the Olefinic Double Bond and the Peroxide Linkage in the Decomposition of trans-γ-Benzylidenebutyryl Peroxide," J. Am. Chem. Soc., 84, 2635–2640, 1962.

Hart and Chloupek, "Decomposition of Diacyl Peroxides from exo- and endo-Norbornane-2-carboxylic Acids and exo- and endo-Norbornene-5-carboxylic Acids," J. Am. Chem. Soc., 85, 1155–1160, 1963.

Koenig and Martin, "Participation of a Neighboring Olefinic Double Bond in the Decomposition of a t-Butyl Perester," J. Org. Chem., 29, 1520–1527, 1964.

Cooper, "The Effect of Structure of Diacyl Peroxides on the Rates of Initiation of the Polymerisation of Styrene," J. Chem. Soc., 1951, pp. 3106–3113.

OTHER PUBLICATIONS

Bentrude and Martin, "Neighboring Iodide and Sulfide Groups in t-Butyl Perester Decompositions," J. Am. Chem. Soc., 84, 1561–1571, 1962.

Pryor, *Free Radicals*, McGraw-Hill, New York, 1966, pp. 119–121.

Mayo, "The Dimerization of Styrene," J. Am. Chem. Soc., 90, 1289–1295, 1968.

Pastorino, Lewis and Halle, "Mod. Plast. Encycl. 1978–1979," pp. 208–212.

Nakazato, "Process for Manufacture of Resins for Dental Prosthesis Foundations," Chem Abstr., 109:135005v, 1988.

Sandescu and Simionescu, "Initiating Systems for the Solution Copolymerization of Acrylonitrile," Acta Polymerica, 37, 7–13, 1986.

Freedman, "Industrial Applications of Phase Transfer Catalysis (PTC): Past, Present and Future," Pure Appl. Chem., 58, 857–868, 1986.

Rasmussen and Smith, "Phase Transfer Free Radical Reactions: Polymerization of Acrylic Monomers," Polym. Sci. Technol., vol. 24, *Crown Ethers and Phase Transfer Catalysis in Polymer Science*, 1984, pp. 105–119.

Walling and Papaioannou, "Bond Dissociation Energies of t-Butyl Hypohalites," J. Phys. Chem., 72, 2260–2262, 1968.

Trubitsyna, Margaritova and Medvedev, "Study of the Initiation of Polymerization by the 'Benzoyl Peroxide-Alkylpyridinium' system in Alkaline Media," Polymer Sci., 7, 2160–2164, 1965.

Ghosh and Maity, "Polymerization of Methyl Methacrylate with the Use of Cetyl Trimethyl Ammonium Bromide–Benzoyl Peroxide Combination as the Initiating System," Eurpoean Polymer Journal, 14, 855–859, 1978.

Ghosh and Maity, "Polymerization of Methyl Methacrylate with the Use of Cetyl Trimethyl Ammonium Bromide–Benzoyl Peroxide Combination as the Initiating System," European Polymer Journal, 14, 855–859, 1978.

Ghosh and Maity, "Polymerization of Methylmethacrylate with Cetyl Pyridinium Bromide (CPB)–Benzoyl Peroxide ($BZ_2O_2$) Combination as a Redox Initiator and with CPB as a Lone Photoinitiator," European Polymer Journal, 15, 787–795, 1979.

Ghosh and Maity, "Polymerization of Methylmethacrylate with Cetyl Benzyl Dimethyl Ammonium Chloride and Benzoyl Peroxide as Redox Initiator System," European Polymer Journal, 16, 1115–1119, 1980.

Rasmussen and Smith, "Phase Transfer Free Radical Reactions: Polymerization of Acrylic Monomers in Organic Solution Using Potassium Peroxydisulfate in the Presence of Quaternary Ammonium Salts," Makromol. Chem., 182, 701–703, 1981.

Hahn, Jaeger, Wandrey and Reinisch, "The Kinetics of Radical Polymerization of Dimethyl-Diallyl Ammonium Chloride," Acta Polym., 35, 350–358, 1984.

Perdih, "Polymerization of Methylmetacrylate in the Presence of Quaternary Ammonium Salts," Polym. Bull., 21, 151–158, 1989.

Simionescu, Mihailescu and Bulacovschi, "Radical Polymerization at Phase Transfer Conditions I. Polymerization of Butylmethacrylate in the System Persulfate–Quaternary Ammonium Salts," Acta Polym., 38, 502–503, 1987.

Ghosh and Mandal, "Mechanism of Phase-Transfer-Agent-Aided Free Radical Polymerization using Potassium Peroxydisulfate Initiator and Tetrabutylammonium Bromide Phase-Transfer Agent," Macromolecules, 19, 19–25, 1986.

Choi and Lee, "Kinetics of Bulk Free-Radical Polymerization of Methyl Methacrylate using Potassium Peroxydisulfate with 18-Crown-6 as Phase-Transfer Catalyst," Ind. Eng. Chem., 26, 2079–2086, 1987.

Ghosh, Gupta and Mandal, "On the Rate and Activation Parameters for the Primary Decomposition of a Quaternary Ammonium Persulfate in Moderately Polar Organic Solvents," Makromol. Chem., 187, 2097–2102, 1986.

Rafikov, Yunusov, Akhmedova, Ismailov and Askarov, "Radical Polymerization of Butyl Methacrylate in the Presence of Cationic Surfactant," Doklady Akademii nauk UzSSR, vol. 1, 1989, pp. 44–45 (Abstract Only).

Trubitsyna, Margaritova and Medvedev, "Low Temperature Emulsion Polymerization of Methyl Methacrylate in the Presence of Benzoyl Peroxide," Polymer Sci., USSR, vol. 7, 2165–2170, 1965 (Vysokomol. soyed).

Ismailov, Tillyaev, Aminov, Corneva and Jalilov, "Some Features of Low-Temperature Polymerization of Chloroethyl Methacrylate," Uzbekhian Chemical Journal, 4, 54–56, 1982.

Perdih, Malavasic and Vizovisek, "The Influence of Trioctyl Methyl Ammonium Salts on the Decomposition of Initiators studied by DSC," Thermochimica Acta, 134, 237–241, 1988.

POLYMERIZATION WITH INITIATOR AND QUATERNARY AMMONIUM SALT

This is a continuation of U.S. patent application Ser. No. 07/716,938, filed Jun. 18, 1991, now abandoned.

BACKGROUND OF THE INVENTION

This invention relates to an improved polymerization process, and more particularly to a polymerization process wherein starting material such as a monomer, a mixture of monomers, a partially polymerized product, or a mixture of fully polymerized product and monomer or a monomer mixture is reacted with an initiator and a quaternary ammonium salt under polymerization conditions wherein polymerization or further polymerization of the starting material is initiated. The invention also relates to a polymerization process wherein an unsaturated polymer such as a polyester in a polymerizable monomer is reacted to form a crosslinked polymer structure.

Quaternary ammonium salts have been used previously in conjunction with potassium peroxydisulfate to initiate the polymerization of butyl acrylate in ethyl acetate solution. See, for example, J.K. Rasmussen, H.K. Smith, "Phase Transfer Free Radical Reactions: Polymerization of Acrylic Monomers in Organic Solution Using Potassium Peroxydisulfate in the Presence of Quaternary Ammonium Salts," Makromol. Chem., Volume 182, pages 701–703 (1981). However, in addition to using both an organic and an aqueous phase, these reactions require the use of a crown ether to make the peroxide soluble in the organic medium.

Potassium peroxydisulfate was also used as an initiator in the investigation of the kinetics of the phase-transfer-agent-aided free radical polymerization of styrene. This study was done at 60° C. using tetrabutylammonium bromide as the phase-transfer agent and o-dichlorobenzene as a solvent. See, N.N. Ghosh and B.M. Mandal, Macromolecules, Volume 19, pages 19–25 (1986).

In another study, a potassium persulfate-tetraethylammonium bromide initiating system was used for copolymerization of acrylonitrile in an aqueous ethylene glycol carbonate solution. A mixture of acrylonitrile, vinyl acetate and methylstyrene was used and the reactions were carried out at relatively high temperatures of 65, 70 and 80° C. See, F. Sandescu and C.I. Simionescu, Acta Polymerica, Volume 37, pages 7–13 (1986).

Methyl methacrylate (MMA) has been polymerized employing dimethyl formamide solvent and using cetyl trimethyl ammonium bromide or cetyl benzyl dimethyl ammonium chloride with benzoyl peroxide as the initiating system. See, P. Ghosh and S.N. Maity, European Polymer Journal, Volume 14, pages 855–859 (1978); P. Ghosh and S.N. Maity, European Polymer Journal, Volume 16, pages 1115–1119 (1980). Both of these systems require the addition of dimethylformamide to the MMA to dissolve the quaternary ammonium salt. Moreover, the reaction is carried out at the elevated temperature of 40° C.

MMA has also been polymerized at 50° C. in the presence of trioctyl methyl ammonium salts initiated by dibenzoyl peroxide using a benzene or dimethyl phthalate solvent. See, A. Perdih, Polymer Bulletin, Volume 21, pages 151–158 (1989); A. Perdih, T. Malavasic and I. Vizovisek, Thermochimica Acta, Volume 134, pages 237–241 (1988).

In all of the above work, polymerization was carried out at temperatures above ambient temperature, a solvent was necessary or there were several phases. In contrast, the inventors have discovered a number of polymerization processes which can be carried out at room temperature, in the absence of an additional solvent, and/or in a single phase organic medium. In one form, selected quaternary ammonium salts in addition to an initiator that may be an organic peroxide, hydroperoxide or perester can be used to polymerize certain monomers or monomer mixtures. These selected quaternary ammonium salts plus a selected initiator can also be reacted with a partially polymerized compound in the syrup stage or a syrup prepared from a fully polymerized compound dissolved in a monomer or a mixture of monomers to form a solid polymer. In addition, the selected quaternary ammonium salt-initiator combination can be used to form a crosslinked polymer structure from an unsaturated polymer such as a polyester in a polymerizable monomer.

Solid polymers or viscous liquid polymers will often entrap solvent and it is difficult in certain cases, such as in thick castings, to remove the entrapped solvent. The present invention avoids this problem. Entrapped solvent can act like plasticizers and the removal of entrapped solvent will effect polymer volume.

It is, therefore, a principal object of this invention to provide improved polymerization processes which can be carried out without an additional solvent for the reactants.

It is a further object of this invention to provide improved polymerization processes which can be carried out at reduced temperatures.

It is yet another object of this invention to provide improved polymerization processes which can be carried out in a single phase organic medium.

It is still another object of this invention to provide improved polymerization processes for polymerizing selected monomers or monomer mixtures, or for forming polymers from partially or fully polymerized syrups easily and effectively.

Quaternary ammonium salt—peroxide/peroxy acid/hydroperoxide/perester systems of the type developed by the inventors have other advantages over previous systems for initiating polymerization as well. That is, the former are particularly well suited for casting polyester and methacrylate resins.

Thus, it is a further object of this invention to provide improved polymer resins and polymerization syrups.

SUMMARY OF THE INVENTION

This invention is a polymer prepared from a novel process. The first embodiment is a polymerization process comprising the steps of preparing and reacting a polymerization mixture consisting essentially of about 1000 mole units of at least one monomer type having a polymerizable double bond; from about 0.1 to about 100 mole units of an initiator miscible with the polymerization mixture and selected from the group consisting of organic peroxides, hydroperoxides and peresters; and from about 0.01 to about 100 mole units of a quaternary ammonium salt, miscible with the polymerization mixture, of the formula

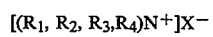

wherein $R_1$, $R_2$, $R_3$ and $R_4$ are selected from the group consisting of branched or normal, saturated or unsaturated, alkyl, aralkyl, alkoxyalkyl, cycloalkyl and hydroxyalkyl and wherein $X^-$ is fluoride, chloride, bromide or bibenzoate. From this mixture, a polymer is formed from the monomer type.

In a second embodiment of the invention, a polymerization mixture is prepared comprising about 1000 mole units of a monomer type having a polymerizable double bond; from about 0.1 to about 100 mole units of an initiator miscible with the polymerization mixture and selected from the group consisting of organic peroxides, hydroperoxides and peresters; and from about 0.01 to about 100 mole units of a quaternary ammonium salt, miscible with the polymerization mixture, of the formula $$[(R_1, R_2, R_s, R_4)N^+]X^{31}$$

wherein $R_1$, $R_2$, $R_3$ and $R_4$ are selected from the group consisting of branched or normal, saturated or unsaturated, alkyl, aralkyl, alkoxyalkyl, cycloalkyl and hydroxyalkyl and wherein $X^-$ is fluoride, chloride, bromide or bibenzoate. In accordance with this second embodiment of the invention, the polymerization mixture is reacted at a temperature sufficient to induce polymerization, but at a temperature at least 20° C below the normal 10 hour half-life temperature of the initiator, to form a polymer from the monomer type.

In a third embodiment of the invention, a polymerization process is provided which comprises preparing a polymerization mixture comprising about 1000 mole units of a monomer type having a polymerizable double bond; from about 0.1 to about 100 mole units of an initiator miscible with the polymerization mixture and selected from the group consisting of organic peroxides, hydroperoxides and peresters; and from about 0.01 to about 100 mole units of a quaternary ammonium salt, miscible with the polymerization mixture, of the formula $$[(R_1, R_2, R_3, R_4)N^+]X^-$$

wherein $R_1$, $R_2$, $R_3$ and $R_4$ are selected from the group consisting of branched or normal, saturated or unsaturated, alkyl, aralkyl, alkoxyalkyl, cycloalkyl and hydroxyalkyl and wherein $X^-$ is fluoride, chloride, bromide or bibenzoate. In accordance with this third embodiment of the invention, the polymerization mixture is reacted in a single phase organic medium to form a polymer from the monomer type.

A fourth embodiment of the invention involves a polymerization process comprising the steps of preparing and reacting a polymerization mixture consisting essentially of about 1000 mole units of a liquid partially polymerized compound made up of at least one monomer type having a polymerizable double bond; from about 0.1 to about 100 mole units of an initiator miscible with the polymerization mixture and selected from the group consisting of organic peroxides, hydroperoxides and peresters; and from about 0.01 to about 100 mole units of a quaternary ammonium salt, miscible with the polymerization mixture, of the formula $$[(R_1, R_2, R_3, R_4)N^+]X^-$$

wherein $R_1$, $R_2$, $R_3$ and $R_4$ are selected from the group consisting of branched or normal, saturated or unsaturated, alkyl, aralkyl, alkoxyalkyl, cycloalkyl and hydroxyalkyl and wherein $X^-$ is fluoride, chloride, bromide or bibenzoate. From this mixture, a polymer is formed from the liquid partially polymerized compound.

In a fifth embodiment of the invention, a mercaptan free polymerization mixture is prepared comprising about 1000 mole units of a liquid partially polymerized compound made up of at least one monomer type having a polymerizable double bond; from about 0.1 to about 100 mole units of an initiator miscible with the polymerization mixture and selected from the group consisting of organic peroxides, hydroperoxides and peresters; and from about 0.01 to about 100 mole units of a quaternary ammonium salt, miscible with the polymerization mixture, of the formula $$[(R_1, R_2, R_3, R_4)N^+]X^-$$

wherein $R_1$, $R_2$, $R_3$ and $R_4$ are selected from the group consisting of branched or normal, saturated or unsaturated, alkyl, aralkyl, alkoxyalkyl, cycloalkyl and hydroxyalkyl and wherein $X^-$ is fluoride, chloride, bromide or bibenzoate. In accordance with this fifth embodiment of the invention, the polymerization mixture is reacted at a temperature sufficient to induce polymerization to form a polymer from the liquid partially polymerized compound.

A sixth embodiment of the invention involves a polymerization process comprising the steps of preparing and reacting a liquid polymerization mixture consisting essentially of about 1000 mole units of a monomer type having a polymerizable double bond; an amount of a preformed polymer miscible with the polymerization mixture from 0.01 to 2 times the weight of the monomer type present; from about 0.1 to about 100 mole units of an initiator miscible with the polymerization mixture and selected from the group consisting of organic peroxides, hydroperoxides and peresters; and from about 0.01 to about 100 mole units of a quaternary ammonium salt, miscible with the polymerization mixture, of the formula $$[(R_1,R_2,R_3,R_4)N^+]X^-$$

wherein $R_1$, $R_2$, $R_3$ and $R_4$ are selected from the group consisting of branched or normal, saturated or unsaturated, alkyl, aralkyl, alkoxyalkyl, cycloalkyl and hydroxyalkyl and wherein $X^-$ is fluoride, chloride, bromide or bibenzoate. The preformed polymer may contain polymerizable double bonds and become chemically bonded to the polymer that is formed from this mixture, but it is not necessary that the preformed polymer contain polymerizable double bonds.

In a seventh embodiment of the invention, a solvent free polymerization process is provided wherein a solvent free polymerization liquid mixture is prepared comprising about 1000 mole units of a monomer type having a polymerizable double bond; an amount of a preformed polymer miscible with the polymerization mixture from about 0.01 to 2 times the weight of the monomer type present; from about 0.1 to about 100 mole units of an initiator miscible with the polymerization mixture and selected from the group consisting of organic peroxides, hydroperoxides and peresters; and from about 0.01 to about 100 mole units of a quaternary ammonium salt miscible, with the polymerization mixture, of the formula $$[(R_1,R_2,R_3,R_4)N^+]X^-$$

wherein $R_1,R_2,R_3$ and $R_4$ are selected from the group consisting of branched or normal, saturated or unsaturated alkyl, aralkyl, alkoxyalkyl, cycloalkyl and hydroxyalkyl and wherein $X^-$ is fluoride, chloride, bromide or bibenzoate to produce a polymer. In accordance with this seventh embodiment of the invention, the polymerization mixture is reacted at a temperature sufficient to induce polymerization, but at a temperature at least 20° C. below the normal 10 hour half-life temperature of the initiator, to form a polymer. The preformed polymer may contain polymerizable double bonds and become chemically bonded to the polymer that is formed from this mixture, but it is not necessary that the preformed polymer contain polymerizable double bonds.

In an eighth embodiment of the invention, a polymerization process is provided comprising preparing a polymerization liquid mixture consisting essentially of about 1000 mole units of a monomer type having a polymerizable double bond; an amount of a preformed polymer miscible with the polymerization mixture from about 0.01 to 2 times the weight of the monomer type present; from about 0.1 to about 100 mole units of an initiator miscible with the polymerization mixture and selected from the group consisting of organic peroxides, hydroperoxides and peresters; and from about 0.01 to about 100 mole units of a quaternary ammonium salt, miscible with the polymerization mixture, of the formula $$[(R_1,R_2,R_3,R_4)N^+]X^-$$

wherein $R_1$, $R_2$, $R_3$ and $R_4$ are selected from the group consisting of branched or normal, saturated or unsaturated, alkyl, aralkyl, alkoxyalkyl, cycloalkyl and hydroxyalkyl and wherei $X^-$ is fluoride, chloride, bromide or bibenzoate. In accordance with this eighth embodiment of the invention, the polymerization mixture is a homogenous phase and reacts to form a polymer. The preformed polymer may contain polymerizable double bonds and become chemically bonded to the polymer that is formed from this mixture, but it is not necessary that the preformed polymer contain polymerizable double bonds.

DETAILED DESCRIPTION OF THE PREFERRED EMBODIMENTS OF THE INVENTION

The present invention provides a novel polymerization process which is believed to involve the molecule-induced homolysis of selected peroxides, hydroperoxides or peresters to initiate reduced temperature radical polymerization of a starting material to produce a polymer. In this process, the starting material, which may be a selected monomer having a polymerizable double bond and preferably a Q value of greater than 0.1 in the Q-e scheme described below, a mixture of monomers containing at least one of such monomers, a partially polymerized product made up of such monomer(s), or a mixture of polymerized product and such monomer(s) is combined with an organic peroxide, hydroperoxide or a perester miscible with the polymerization mixture in the absence of solvent, and a selected quaternary ammonium salt that is also miscible with the polymerization mixture in the absence of an additional solvent.

It is believed that reaction of the foregoing mixture produces free radicals to initiate polymerization or further polymerization of the starting material. The process is useful for casting and curing applications.

The inventors have found that monomer types which have a polymerizable double bond may be employed in this process. Similarly, when the starting material is a partially polymerized compound, the constituent monomer or monomers shall be such monomer types. The Q value of the monomer or monomers may also be important, depending on the type of polymerization being carried out and the particular monomers and initiator being used.

The Q value of a monomer is a measure of its general reactivity in a radical-monomer reaction as determined from a Q-e scheme which has been used to correlate the structure and reactivity of such a reaction on a quantitative basis. It has been proposed that the rate constant for a radical-monomer reaction, for example, for the reaction of $M_1$·radical with $M_2$·monomer be written as: $k_{12}=P_1Q_2\exp(-e_1e_2)$ where $P_1$ and $Q_2$ are measures of the resonance stabilization of $M_1$·radical and $M_2$·monomer, respectively, and $e_1$ and $e_2$ ("e" values herein) are measures of their respective polarities. The Q-e scheme is discussed in G. Odian, "Principles of Polymerization" (Second Edition), 1981, John Wiley & Sons, Inc. at pages 463–466, the disclosure of which is hereby incorporated by reference.

In homopolymerizations it is preferred that the monomer types have a Q value of greater than 0.1. However, in copolymerizations, the Q value of the monomers may be less than 0.1, depending on the monomers used. For example, monomers with low Q values ($\leq 0.1$) as a class tend to copolymerize well with each other while monomers with higher Q values ($>0.1$) as a class tend to copolymerize well with each other, regardless of the e value of the monomers. If the e values of the monomers are quite different, however, copolymerization is even more favored. On the other hand, copolymerization of monomers having very different Q values, one significantly less than 0.1 and the other significantly greater than 0.1, will occur if the e values of the monomers are quite different. For example, maleic anhydride, which has a fairly low Q value, will often copolymerize quite well with a monomer having a Q value of greater than 0.1, such as styrene.

Also, some initiators which are commonly used at higher temperatures of greater than 50° C. and which form highly reactive free radical species, such as dicumyl peroxide or di-t-butyl peroxide, can be used to initiate polymerization of monomer types with Q values of less than 0.1.

Examples of monomer types which may be used in this polymerization process include substituted and unsubstituted dienes such as 1,3-butadiene, chloroprene, 2,3dichlorobutadiene, 2,4-dichlorobutadiene, 2-phenylbutadiene, 2,3diphenylbutadiene, 2,4-diphenylbutadiene and isoprene.

Other examples of monomer types include the following vinyl benzenes: styrene, chlorostyrene, bromostyrene, fluorostyrene, methoxystyrene and acetoxystyrene.

A wide variety of substituted and unsubstituted acrylate monomer types may also be used in this invention including acrylic acid, methyl acrylate, ethyl acrylate, butyl acrylate, propyl acrylate, benzyl acrylate, acrylonitrile, methacrylic acid, methyl methacrylate, ethyl methacrylate, butyl methacrylate, propyl methacrylate, benzyl methacrylate, phenyl methacrylate, naphthyl methacrylate, glyceryl methacrylate, methacrylonitrile, allyl hydroxymethylacrylate, allyl methacrylate, hydroxymethyl methacrylate, glycidyl methacrylate, ethyl bromoacrylate, methyl chloroacrylate, acrylamide, methacrylamide, N,N-dimethylacrylamide and siliconized analogs of acrylates or methacrylates.

Various unsaturated ketone and aldehyde monomer types may also be used as starting material such as methyl vinyl ketone and acrolein (propenal).

Fumarate monomer types which can be used in the invention include dimethyl fumarate, diethyl fumarate and fumaronitrile.

Maleates is another class of monomers from which the starting material may be selected. Such compounds include maleic anhydride, dimethyl maleate, N-alkyl-maleimides and N-arylmaleimides, as well as the esters of these compounds.

It should be noted that the fumarate and maleate monomer types are used mostly in copolymerizations; these compounds generally will not homopolymerize.

Additional monomer types for use as starting material include t-butyl vinyl ether, N-vinylpyrrolidone, 2-vinylpyridine, 4-vinylpyridine and vinylidene chloride, as well as other unsaturated compounds having a polymerizable double bond and an appropriate Q value in the Q-e scheme, depending on the starting material and/or the type of polymerization.

In addition to using monomers and monomer mixtures as the starting material, the process can also be used to form a polymer from a polymerization syrup, that is, from a partially polymerized compound or fully polymerized compound that is dissolved in a monomer type having the above characteristics. These partially or fully polymerized compounds can include, for example, product made up of any one of the above monomers, including polyesters derived from fumaric acid, maleic acid or maleic anhydride. Partially polymerized polyester in the syrup form can also be used. Partially or fully polymerized copolymers incorporating any two or more of the above monomers can also be used, as can copolymers containing stilbene, α-methylstyrene, 1,1-diphenylethylene, diallyl carbonate or the diallyl ether of bisphenol A.

These compounds are merely illustrative examples of starting material that may be used in connection with this invention, and it is to be understood that any other unsaturated monomer(s) having a polymerizable double bond or partially or fully polymerized compound made up of such monomers can be used.

For most polymerization reactions there is a ceiling temperature which is the temperature at which the rate of polymerization is equal to the rate of depolymerization. For most starting material this temperature is sufficiently high so as not to impose any practical limitations on the reaction temperature ranges. However, it should be noted that some highly substituted compounds, such as α-methylstyrene, have relatively low ceiling temperatures which can impose practical upper limits on the temperature ranges in which those compounds can be reacted.

In another embodiment, the above polymerization mixture can contain one or more compatibilizing monomers, in addition to the other combination of starting materials, that may be incorporated into the polymerized product. These compatibilizing monomers are miscible in the polymerization mixture and will contain a solubilizing group that may be an ether, ester, carbonyl, amide or hydroxy group. The compatibilizing monomers serve to assist in solubilizing certain quaternary salts in the polymerization mixture, as hereinafter described. A polymerizable double bond must also be present in the compatibilizing monomer to provide a reactive site for polymer formation. These compatibilizing monomers can be any of the following substituted compounds dialkyl ketones, alkyl aryl ketones, alkyl aralkyl ketones, diaryl ketones, diaralkyl ketones, arylaralkyl ketones, alkenyl alkyl ketones, dialkyl esters, alkyl aryl esters, alkyl aralkyl esters, diaryl esters, diaralkyl esters, dialkyl ethers, alkyl aryl ethers, alkyl aryl ethers, alkyl aralkyl ethers, diaryl ethers, diaralkyl ethers, arylaralkyl ethers and alkenyl alkyl ethers.

Specific examples of compatibilizing monomers that can be used include trimethylolpropane diallyl ether (TMPDE), hexyl acrylate, N-lauryl methacrylamide, hydroxethyl methacrylate, hydroxethyl acrylate, methoxyethyleneoxyethyl methacrylate, methoxyethyleneoxyethyl acrylate, dimethylaminoethyl methacrylate, dimethylaminoethyl acrylate, 2-allyloxyethyl methacrylate, 2-allyloxyethyl acrylate, glyceryl monomethacrylate, glyceryl dimethacrylate, glyceryl monoacrylate, glyceryl diacrylate, 2-hydroxy-3-phenoxypropyl methacrylate, N-(2-hydroxypropyl) methacrylamide, N-(2-hydroxypropyl) acrylamide, bis (N-2-hydroxypropyl) methacrylamide, bis (N-2-hydroxypropyl) acrylamide, dimethylmethacrylamide, dimethylacrylamide, N-vinylpyrrolidone, bis(hydroxyethyl) acrylamide, bis(hydroxyethyl) methacrylamide, 2-hydroxypropyl acrylate, 2-hydroxypropyl methacrylate, 2-hydroxypropyl acrylate, bis(2-hydroxypropyl) acrylamide, bis(2-hydroxypropyl) methacrylamide.

In accordance with the invention, the polymerization process is initiated by an organic peroxide, hydroperoxide or perester which the inventors believe dissociates to yield free radicals. Although a variety of initiators may be used in this invention, it is a requirement that any initiator used be capable of initiating free radical polymerization of the starting material in the presence of the selected quaternary ammonium salt.

As is the case with the quaternary ammonium salt, the selected initiator must also be miscible with the polymerization mixture. For a particular initiator, some quaternary ammonium salts exhibit more activity. From about 0.1 to about 100 mole units and preferably from about 0.5 to about 2 mole units of initiator is added to the polymerization mixture per 1000 or more units of starting material.

It has been found that various organic peroxides including hydroperoxides, and peresters possess the above characteristics, and therefore may be used in this invention. These compounds include alkyl peroxides, acyl peroxides, acyl alkyl peroxides, α-hydroxyalkyl peroxides, α-hydroxyalkyl alkyl peroxides, alkyl hydroperoxides, α-hydroxyalkyl hydroperoxides, acyl hydroperoxides and diallyl peroxy carbonate. Specific examples of initiators recommended for this process preferably include benzoyl peroxide, dicumyl peroxide, di-t-butyl peroxide, t-butyl hydroperoxide, cumene hydroperoxide, the peroxides of trimethylolpropane diallyl ether, t-butyl perbenzoate, and lauroyl peroxide, the latter being especially preferred. Other examples of initiators for use with this invention include di-decanoyl peroxide, di-octanoyl peroxide, tert-butylperoxy-2-ethylhexanoate, tert-butylperoxydiethylacetate, tert-butylperoxyisobutyrate, 1,1-di-tert-butylperoxy-3,3,5-trimethylcyclohexane, 1,1-di-tert-butylperoxycyclohexane, tert-butylperoxy-3,5,5-trimethylhexanoate, tertbutylperoxyisopropylcarbonate, 2,2-di-tert-butylperoxybutane, tert-butylperoxystearylcarbonate, tert-butylperoxyacetate, tert-butylperoxybenzoate, 4,4-di-tert-butylperoxy-n-butylvalerate, 2,5-dimethyl-2-di-tert-butylperoxyhexane, tertbutylcumylperoxide, [tert-butylperoxyisopropyl] benzene, di-tert-butylperoxycyclohexane-di-carboxylate and azo-bisisobutyronitrile.

The normal 10-hour half-life temperature of a peroxide is the temperature at which the peroxide will decrease to one half of its original concentration in 10 hours in the absence of a quaternary ammonium salt. Organic peroxides with high 10-hour half-life temperatures have the advantage of producing very reactive radicals which are useful for the polymerization of monomers with low reactivity, yet they can be stored and handled more safely than low-temperature peroxides because of their relative stability. This invention allows their safe application at lower temperatures. Peroxides with a relatively low 10-hour half-life temperature may be used advantageously for processing at even lower temperatures, minimizing side reactions and allowing greater control of the reaction rate.

For a given monomer and initiator, lower temperatures favor increased polymer chain length.

It has been found that quaternary ammonium salts can have a tremendous effect on the rates of decomposition of certain organic peroxide, hydroperoxide or perester compounds to generate free radicals. These quaternary ammonium salts increase the rate of decomposition of a selected initiator at a given temperature. It is also believed that these quaternary ammonium salts act to lower the normal 10-hour half-life temperature of the initiators from between 10 and 50° C., or more. Lower temperatures minimize side reactions and permit room temperature polymerizations of many polymer systems. Thus, it is a requirement that the particular quaternary ammonium salt selected be capable of reacting with the chosen initiator. The quaternary ammonium salt must also be miscible with the polymerization mixture. It is believed that the quaternary ammonium salt acts in a manner similar to a catalyst in the polymerization process, although it may or may not be consumed in the reaction.

From about 0.01 to about 100 mole units of quaternary ammonium salt is added to the polymerization mixture per 1000 mole units of starting material. The preferred range is from about 0.05 to about 0.2 mole units of quaternary ammonium salt per 1000 mole units of starting material.

The quaternary ammonium salt should usually have a structure that makes it miscible with monomers. This means that the cation of the quaternary ammonium salt should have at least one long hydrocarbon chain, or, preferably, three or four hydrocarbon chains of four or more carbons attached to it. If a highly polar quaternary ammonium salt is used, a compatibilizing monomer can be used to solubilize the quaternary ammonium salt. In that case, sufficient compatibilizing monomer is added to dissolve the quaternary ammonium salt, and to keep the polymerization mixture homogenous. This solution is then added to the starting material.

Compounds having the above miscibility and reactivity characteristics and having the formula $[(R_1,R_2,R_3,R_4)N^+]X^-$ wherein $R_1,R_2,R_3$ and $R_4$ are selected from the group consisting of branched or normal, saturated or unsaturated, alkyl, aralkyl, alkoxyalkyl, cycloalkyl and hydroxyalkyl and wherein $X^-$ is a suitable anion such as fluoride, chloride, bromide or bibenzoate.

Suitable quaternary ammonium salts for use in this invention include alkyl dimethylbenzylammonium chloride (50% C14, 40% C12, 10% C16) (80%) in isopropanol (12%) with 8% inerts (produced and sold under the name Sherex Variquat 80MC by Sherex Corporation, Columbus, Ohio), benzyl triethylammonium chloride, tetrabutylammonium bibenzoate, tetramethylammonium chloride, tetramethylammonium bromide, trialkyl methylammonium chloride (60% C8 and 40% C10) (90%) in solution with 5% water and 5% alcohol (sold under the name Aliquat 336 by Henkel Corporation), trioctylmethylammonium bromide, tetrabutylammonium hydrogen sulfate (TBAHS), tetrabutylammonium chloride and bromide, tetraheptylammonium chloride (THAC) and bromide, didodecyldimethylammonium bromide, tetrahexylammonium chloride and bromide, and tetrapentylammonium chloride and bromide, trioctylpropylammonium chloride and bromide, and trioctylethylammonium chloride and bromide.

Some quaternary ammonium salts are supplied commercially in solutions of alcohol and/or water. Preferably solvent free quaternary ammonium salts are used because alcohols and water can be soluble in monomer mixtures and the polymer product. But in some instances quaternary ammonium salt solutions will have to be used.

Various known modifying agents may also be formulated in the polymerization mixture before the polymer is formed to improve the polymer product such as plasticizers, fire retardants and coloring agents. Examples of plasticizing agents for use with this invention include triphenylphosphate and tricresyl phosphate. A number of other plasticizing agents suitable for use in connection with the present process are illustrated and described in "Additives for Plastics" by J. Stepek and H. Daoust, Springer-Verlag, New York, 1983, the disclosure of which is hereby incorporated by reference.

In one form of the invention, about 1000 mole units of one or more of the above-mentioned monomers are combined with one of the above initiators and a quaternary ammonium salt of the above formula in a suitable reaction vessel that provides an inert atmosphere. From about 0.1 to about 100 mole units of the initiator and from about 0.01 to about 100 mole units of the quaternary ammonium salt are added per 1000 mole units of starting material. This mixture is then allowed to react, preferably at a temperature at least 20° C. and preferably at least 30° C. less than the normal 10-hour half-life temperature of the particular initiator chosen.

It is preferred that the reaction mixture not contain oxygen, but the presence of oxygen will generally not prevent the polymerization of monomers such as styrene and acrylates. Oxygen can be removed under vacuum or inert gas purge.

The term "mole units" as used herein is intended to indicate the molar ratios or molar ratio ranges of the reactants but is not intended to limit the individual reactants to specific mole amounts. Thus, with respect to the foregoing example, the molar ratio range of monomer to initiator can range from 10,000 to 100 and the ratio range of monomer to quaternary ammonium salt can range from 10,000 to 10. By way of further example, the following table shows a mole unit ratio of 1000:100:10 of monomer type:quaternary ammonium salt:peroxide.

|  | monomer type | peroxide | quaternary ammonium salt |
| --- | --- | --- | --- |
| case 1 | 1000 moles | 100 moles | 10 moles |
| case 2 | 50 moles | 5 moles | 0.5 moles |
| case 3 | 1 mole | 0.1 moles | 0.01 moles |
| case 4 | 0.1 moles | 0.01 moles | 0.001 moles |

To further illustrate the invention, the following examples are provided. It is to be understood, however, that these examples are for illustrative purposes only and that other variations and combinations of reactants can be used.

EXAMPLE I

A polymerization mixture was prepared by combining 10.0 g (0.100 moles) of methyl methacrylate (MMA), 0.041 g ($1.02 \times 10^{-4}$ moles) of lauroyl peroxide and 0.004 g ($2 \times 10^{-5}$ moles) of benzyltriethylammonium chloride ($\phi CH_2(CH_3CH_2)_3N^-Cl^-$). This solution was then sealed in a bottle with a septum and degassed with $N_2$ to reduce oxygen content. The mixture was allowed to react unmixed and undisturbed at 25° C. A hard cast formed in approximately 18 hours.

Substituting styrene, acrylonitrile or methyl acrylate in the appropriate mole amounts for methyl methacrylate in the above example will produce polystyrene, polyacrylonitrile, or poly(methyl acrylate).

EXAMPLE II

A polymerization mixture was prepared by combining 10.0 g (0.0961 moles) of styrene, 0.043 g ($1.08 \times 10^{-4}$ moles) lauroyl peroxide and 0.013 g ($5.7 \times 10^{-5}$ moles) benzyltriethylammonium chloride. This solution was then sealed in a bottle with a septum and degassed with $N_2$ to reduce oxygen content. The mixture was allowed to react, unmixed and undisturbed at 25° C. This mixture formed a hard cast in approximately 2 days.

EXAMPLE III

A polymerization mixture is prepared by combining 5 g (0.0942 moles) of acrylonitrile, 0.042 g ($1.06 \times 10^{-4}$ moles) lauroyl peroxide and 0.024 g ($1 \times 10^{-4}$ moles) of benzyltriethylammonium chloride ($\phi CH_2(CH_3CH_2)_3N^+Cl^-$). This solution is then sealed in a bottle with a septum and degassed with $N_2$ to reduce oxygen content. The mixture is stored in the dark and allowed to react, unmixed and undisturbed at 22° C. A polymer precipates in approximately 90 minutes.

EXAMPLE IV

A polymerization mixture is prepared by combining 5 g (0.0581 moles) of methyl acrylate, 0.041 g ($1.02 \times 10^{-4}$ moles) lauroyl peroxide and 0.009 g ($4 \times 10^{-5}$ moles) of benzyltriethylammonium chloride ($\phi CH_2(CH_3CH_2)_3N^{+C-1}$). This solution is then sealed in a bottle with a septum, and degassed with $N_2$ to reduce oxygen content. The mixture is stored in the dark and allowed to react, unmixed and undisturbed at 22° C. A gummy or soft solid mass of poly(methyl acrylate) is formed in approximately 18 hours.

EXAMPLE V

A polymerization mixture was prepared by combining 10.28 g (0.0987 moles) styrene, 0.029 g ($1.2 \times 10^4$ moles) benzoyl peroxide and 0.019 g ($3.9 \times 10^{-5}$ moles) tetrabutylammonium bibenzoate. This solution was then sealed in a bottle with a septum, and degassed with $N_2$ to reduce oxygen content. The mixture was allowed to react, unmixed and undisturbed at 25° C. A rubbery partially polymerized polymer formed in approximately 7 days.

EXAMPLE VI

A polymerization mixture was prepared by combining 10.1 g (0.100 moles) MMA, 0.051 g ($2.2 \times 10^{-4}$ moles) t-butyl peroxypivalate and 0,025 g ($5.2 \times 10^{-10}$ moles) tetrabutylammonium bibenzoate. This solution was then sealed in a bottle with a septum and allowed to react, unmixed and undisturbed at room temperature. A partially polymerized soft solid mass formed in approximately 21 hours and a hard cast developed in approximately 3 days.

EXAMPLE VII

This example is similar to Example I but uses a different quaternary ammonium salt, namely tetrabutylammonium bibenzoate. A polymerization mixture was prepared by combining 10.00 g (0.100 moles) MMA, 0,040 g ($1 \times 10^{-4}$ moles) lauroyl peroxide and 0.01 g ($2 \times 10^{-5}$ moles) tetrabutylammonium bibenzoate. This solution was then sealed in a bottle with a septum and allowed to react, unmixed and undisturbed at room temperature. A soft solid mass formed in approximately 18 hours and a hard cast developed in approximately 2 days.

EXAMPLE VIII

This example demonstrates the addition of a compatibilizing monomer. A polymerization mixture was prepared by combining 10.02 g (0.0960 moles) styrene 0.013 g ($1 \times 10^{-4}$ moles), t-butyl hydroperoxide 70%, 0.019 g ($3.9 \times 10^{-5}$ moles) tetrabutylammonium bibenzoate and 1.00 g (0.00467 moles) trimethylolpropane diallyl ether (prewashed with ferrous sulfate to eliminate any peroxides). This solution was then sealed in a bottle with a septum and allowed to react, unmixed and undisturbed at room temperature. A hard cast was formed in approximately 2 weeks.

EXAMPLE IX

A polymerization mixture is prepared by combining 5 g (0.05 moles) of distilled MMA, 0.025 g ($1.05 \times 10^{-4}$ moles) benzoyl peroxide and 1 drop Sherex Variquat 80MC. This solution is then left at room temperature for 12 hours, at the end of which time the solution is precipitated into methanol to isolate the polymer formed.

The following two examples use a mixture of monomer types as the starting material.

EXAMPLE X

A polymerization mixture is prepared by combining 5.06 g (0.0505 moles) MMA, 5 g (0.0478 moles) styrene, 0.041 g ($1.02 \times 10^{-4}$ moles) lauroyl peroxide and 0.008 g ($4 \times 10^{-5}$ moles) benzyl triethyl ammonium chloride. This mixture is then allowed to react at room temperature. A hard cast forms in approximately 3 weeks.

EXAMPLE XI

A polymerization mixture was prepared by combining 5.61 g (0.0652 moles) methacrylic acid, 5.56 g (0.0555 moles) MMA, 0.045 g ($1.1 \times 10^{-4}$ moles) lauroyl peroxide and 0,010 g ($2.1 \times 10^{-5}$ moles) tetrabutyl ammonium bibenzoate. This mixture was then allowed to react at room temperature. A hard cast formed in approximately 20 hours.

EXAMPLE XII

This example illustrates a partially polymerized system. A polymerization mixture is prepared by combining 30 g (0.30 moles) MMA, 0.18 g ($9.1 \times 10^{-4}$ moles) ethylene glycol dimethylacrylate and 0.2 g ($8.2 \times 10^{-4}$ moles) benzoyl peroxide. The above polymerization mixture is prepolymerized to a casting viscosity at 70° C. with stirring. The polymerization to a hard cast is completed by addition of 0.012 g ($5.3 \times 10^{-5}$ moles) of benzyl triethyl ammonium chloride to the prepolymerization mixture at 25° C.

EXAMPLE XIII

This example demonstrates polymerization of a partially polymerized system. A polymerization mixture is prepared by combining 10.00 g (0.100 moles) MMA and 0.000242 g ($1.00 \times 10^{-6}$ moles) benzoyl peroxide. This mixture is partially polymerized by photoinitiation. The resulting mixture of monomer and polymer is polymerized to completion by addition of 0.00242 g ($1.00 \times 10^{-5}$ moles) benzoyl peroxide and 0.009 g ($1.9 \times 10^{-5}$ moles) tetrabutyl ammonium bibenzoate. The polymerization is carried out preferably between 20° and 25° C.

EXAMPLE XIV

This example demonstrates polymerization of a macromer (polymerizable polymer). A polymerization mixture is prepared by combining 50 g (0.005 moles) of liquid poly(methyl methacrylate) (PMMA) which is prepared in the presence of the catalytic chain transfer agent, bisdimethyl glyoximatocobalt complex, so that the macromers produced have terminal end double bonds; 5 g (0.0500 moles) MMA or similar monomer; 0.041 g ($1.02 \times 10^{-4}$ moles) lauroyl peroxide; and 0.009 g ($119 \times 10^{-5}$ moles) tetrabutyl ammonium bibenzoate. The polymerization mixture is allowed to sit at a temperature between 20° and 25° C. until a solid cast is formed.

EXAMPLE XV

This is an example of a copolymerization. A copolymerization mixture is prepared by mixing 5 g (0.05 moles) of distilled MMA, 0.5 g ($4.8 \times 10^{-3}$ moles) of distilled styrene, 0.05 g benzoyl peroxide and 2 drops of Variquat 80MC. This mixture is allowed to stand at 25° C. for several days until it becomes a hard plastic.

EXAMPLE XVI

A polymerization mixture was prepared by combining 10.06 g (0.100 moles) MMA 0 055 g ($2.03 \times 10^{-4}$ moles) dicumyl peroxide and 0.010 g ($3.2 \times 10^{-5}$ moles) tetrabutylammonium bibenzoate. This mixture was allowed to react at 40° C. A hard cast formed in approximately one week.

EXAMPLE XVII

A polymerization mixture was prepared by combining 10.62 g (0.105 moles) MMA, 0.027 g ($1.0 \times 10^{-4}$ moles) dicumyl peroxide and 0.009 g ($4 \times 10^{-5}$ moles) benzyltriethylammonium chloride. This mixture was allowed to react at 25° C. A hard cast formed in approximately three days.

EXAMPLE XVIII

A polymerization mixture is prepared by combining 70.00 g (1.00 mole) methyl vinyl ketone, 0.232 g (0.00100 moles) t-butyl peroxypivalate 75% and 0.154 g (0.00100 moles) tetramethylammonium bromide. The mixture is sealed under a nitrogen atmosphere and allowed to react at 15° C.

EXAMPLE XIX

A polymerization mixture is prepared by combining 86 g (1 mole) methacrylic acid, 0.13 g (approx. 0.13 ml; 0.0010 moles) t-butyl hydroperoxide 70% and 0.41 g (0.0010 moles) cetyldimethylbenzylammonium chloride. This mixture is allowed to react at 20° C.

EXAMPLE XX

A polymerization mixture is prepared by combining 10 g (0.100 moles) styrene, 4.9 g (0.050 moles) maleic anhydride, 0,025 g ($1 \times 10^{-4}$ moles) benzoyl peroxide and 0.0027 g ($1 \times 10^{-5}$ moles) benzyltriethylammonium chloride. This mixture is allowed to react at 30° C.

EXAMPLE XXI

A polymerization mixture is prepared by combining 5.3 g (0.10 moles) acrylonitrile, 1.6 g (0.020 moles) fumaronitrile, 0.023 g ($1 \times 10^{-4}$ moles) di-t-butyl peroxycarbonate and 0.0023 g ($1 \times 10^{-5}$ moles) benzyltriethylammonium chloride. This mixture is allowed to react at 20° C.

EXAMPLE XXII

A polymerization mixture is prepared by combining 885 g (10 moles) chloroprene, 0.40 g (0.0010 moles) lauroyl peroxide and 0.045 g (0,001 moles) tetraheptylammonium chloride. This mixture is allowed to react at 25° C.

EXAMPLE XXIII

A polymerization mixture is prepared by combining 9.9 g (0.10 moles) N, N-dimethylacrylamide, 0.0146 g ($1 \times 10^{-4}$ moles) di-t-butyl peroxide and 0.0049 g ($1 \times 10^{-5}$ moles) tetraheptylammonium bromide. This mixture is allowed to react at 50° C.

EXAMPLE XXIV

A polymerization mixture is prepared by combining 9.7 g (0.1 moles) vinylidene chloride, $1 \times 10^{-2}$ moles t-butyl peroxypivalate and $1 \times 10^{-2}$ moles tricaprylylmethylammonium chloride. This mixture is allowed to react at 15° C.

EXAMPLE XXV

A polymerization mixture is prepared by combining 8.8 g (0,100 moles) chloroacrylonitrile, $5-10^{-5}$ moles t-butyl perbenzoate and $5 \times 10^{-6}$ moles benzyltriethylammonium chloride. This mixture is allowed to react at 20° C.

EXAMPLE XXVI

A polymerization mixture is prepared by combining 8.6 g (0.1 moles) methyl acrylate, 0.03 g ($1 \times 10^{-4}$ moles) didecanoyl peroxide, and 0,005 g ($2 \times 10^{-5}$ moles) tetrabutylammonium fluoride. This mixture is allowed to react at 25° C. to form a syrup which is then applied to a surface where it hardens into a film.

It should be readily apparent from the foregoing examples and description that various polymers can be prepared from the improved polymerization processes which can be carried out at room temperature, in the absence of an additional solvent and/or in a single phase reaction medium have been disclosed. Although numerous embodiments have been described, it is to be understood that various changes and modifications may be made without departing from the spirit and scope of the invention, as defined by the appended claims.

We claim:

1. A polymerization process comprising the steps of: preparing a mercaptan free polymerization mixture consisting essentially of:

about 1000 mole units of a liquid partially polymerized compound made up of at least one monomer type having a polymerizable double bond, from about 0.1 to about 100 mole units of an initiator miscible with said polymerization mixture and selected from the group consisting of organic peroxides, hydroperoxides and peresters, and from about 0.01 to about 100 mole units of a quaternary ammonium salt misible with said polymerization mixture and of the formula $$[(R_1, R_2, R_3, R_4)N^+]X^-$$

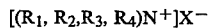

wherein $R_1$, $R_2$, $R_3$ and $R_4$ are selected from the group consisting of branched or normal, saturated or unsaturated, alkyl, aralkyl, alkoxyalkyl, cycloalkyl and hydroxyalkyl and wherein $X^-$ is fluoride, chloride, bromide or bibenzoate, and reacting said polymerization mixture at a temperature sufficient to induce polymerization to form a polymer from said liquid partially polymerized compound.

2. A polymerization process comprising the steps of: preparing and reacting a mercaptan free polymerization mixture consisting essentially of:

about 1000 mole units of a monomer type having a polymerizable double bond, an amount of a preformed polymer miscible with said polymerization mixture from about 0.01 to about 2 times the weight of said monomer type, from about 0.1 to about 100 mole units of an initiator miscible with said polymerization mixture and selected from the group consisting of organic peroxides, hydroperoxides and peresters, and from about 0.01 to about 100 mole units of a quaternary ammonium salt miscible with said polymerization mixture and of the formula $$[(R_1, R_2, R_3, R_4)N^-]X^-$$

wherein $R_1$, $R_2$, $R_3$ and $R_4$ are selected from the group consisting of branched or normal, saturated or unsaturated, alkyl, aralkyl, alkoxyalkyl, cycloalkyl and hydroxyalkyl and wherein $X^-$ is fluoride, chloride, bromide or bibenzoate to form a polymer.

3. A solvent free polymerization process comprising the steps of:

preparing a polymerization mixture free of solvent and mercaptan consisting essentially of:

about 1000 mole units of a monomer type having a polymerizable double bond, an amount of a preformed polymer miscible with said polymerization mixture from about 0.01 to about 2 times the weight of said monomer type, from about 0.1 to about 100 mole units of an initiator miscible with said polymerization mixture and selected from the group consisting of organic peroxides, hydroperoxides and peresters, and from about 0.01 to about 100 mole units of a quaternary ammonium salt miscible with said polymerization mixture and of the formula $$[(R_1, R_2, R_3, R_4)N^+]X^-$$

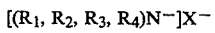

wherein $R_1$, $R_2$, $R_3$ and $R_4$ are selected from the group consisting of branched or normal, saturated or unsaturated alkyl, aralkyl, alkoxyalkyl, cycloalkyl and hydroxyalkyl and wherein $X^-$ is fluoride, chloride, bromide or bibenzoate, and reacting said polymerization mixture at a temperature sufficient to induce polymerization to form a polymer.

4. A polymerization process comprising the steps of: preparing a mercaptan free polymerization mixture consisting essentially of:

about 1000 mole units of a monomer type having a polymerization mixture from about 0.001 to about 2 times the weight of said monomer type, from about 0.1 to about 100 mole units of an initiator miscible with said polymerization mixture and selected from the group consisting of organic peroxides, hydroperoxides and peresters, and from about 0.01 to about 100 mole units of a quaternary ammonium salt miscible with said polymerization mixture and of the formula $$[(R_1, R_2, R_3, R_4)N^+]X^-$$

wherein $R_1$, $R_2$, $R_3$, and $R_4$ are selected from the group consisting of branched or normal, saturated or unsaturated, alkyl, aralkyl, alkoxyalkyl, cycloalkyl and hydroxyalkyl and wherein $X^-$ is fluoride, chloride, bromide or bibenzoate, and reacting said polymerization mixture in a single phase organic medium to form a polymer.

5. The polymerization process as recited in claim 1, wherein said polymerization mixture further consists essentially of a compatibilizing monomer type, having a polymerizable double bond, selected from the group consisting of the following substituted compounds: dialkyl ketones, alkyl aryl ketones, alkyl aralkyl ketones, diaryl ketones, diaralkyl ketones, arylaralkyl ketones, dialkyl esters, alkyl aryl esters, alkyl aralkyl esters, diaryl esters, diaralkyl esters, arylaralkyl esters, dialkyl ethers, alkyl aryl esthers, alkyl aralkyl ethers, diaryl ethers, diaralkyl ethers and arylaralkyl ethers.

6. The polymerization process as recited in claim 2, wherein said polymerization mixture further consists essentially of a compatibilizing monomer type, having a polymerizable double bond, selected from the group consisting of the following substituted compounds: dialkyl ketones, alkyl aryl ketones, alkyl aralkyl ketones, diaryl ketones, diaralkyl ketones, arylaralkyl ketones, dialkyl esters, alkyl aryl esters, alkyl aralkyl esters, diaryl esters, diaralkyl esters, arylaralkyl esters, dialkyl ethers, alkyl aryl ethers, alkyl aralkyl ethers, diaryl ethers, diaralkyl ethers and arylaralkyl ethers.

7. The polymerization process as recited in claim 3, wherein said polymerization mixture further consists essentially of a compatibilizing monomer type, having a polymerizable double bond, selected from the group consisting of the following substituted compounds: dialkyl ketones, alkyl aryl ketones, alkyl aralkyl ketones, diaryl ketones, diaralkyl ketones, arylaralkyl ketones, dialkyl esters, alkyl aryl esters, alkyl aralkyl esters, diaryl esters, diaralkyl esters, arylaralkyl esters, dialkyl ethers, alkyl aryl ethers, alkyl aralkyl ethers, diaryl ethers, diaralkyl ethers and arylaralkyl ethers.

8. The polymerization process as recited in claim 4, wherein said polymerization mixture further consists essentially of a compartibilizing monomer type, having a polymerizable double bond, selected from the group consisting of the following substituted compounds: dalkyl ketones, alkyl aryl ketones, alkyl aralkyl ketones, diaryl ketones, diaralkyl ketones, arylaralkyl ketones, dialkyl esters, alkyl aryl esters, alkyl aralkyl esters, diaryl esters, diaralkyl esters, arylaralkyl esters, diarlkyl ethers, alkyl aryl ethers, alkyl aralkyl ethers, diaryl ethers, diaralkyl ethers and arylaralkyl ethers.

9. The polymerization process as recited in claim 1, wherein said polymerization mixture further consists essentially of at least one monomer type having a polymerizable double bond.

* * * * *

UNITED STATES PATENT AND TRADEMARK OFFICE
CERTIFICATE OF CORRECTION

PATENT NO. : 5,344,902

DATED : September 6, 1994

INVENTOR(S) : H. James Harwood et al.

It is certified that error appears in the above-identified patent and that said Letters Patent is hereby corrected as shown below:

Title page, item [56]

ON PAGE 2 UNDER "OTHER PUBLICATIONS":

lines 5, 6, "Organic and Biological Chemistry 85" should be --J. Am. Chem. Soc., Vol. 85-- line 9, "Organic and Biological Chemistry 87" should be --J. Am. Chem. Soc., Vol. 87-- line 20, "Rabel" should be --Rubel--

ON PAGE 3 UNDER "OTHER PUBLICATIONS"

line 11, after "Abstr.," insert --Vol. 109-- line 11, after "109:135005v" insert --pp. 378-379-- line 18, after "58" insert --No. 6-- line 24, after "72" insert --No. 6-- line 33, "Eurpoean" should be --European-- lines 35, 39, Delete "Ghosh and Maity, "Polymerization of Methyl Methacrylate with the Use of Cetyl Trimethyl Ammonium Bromide-Benzoyl Peroxide Combination as the Initiating System," European Polymer Journal, 14, 855-859, 1978."

Col. 3, line 18, "$[(R_1,R_2,R_5,R_4)N^+]X^{31}$" should be --$[(R_1,R_2,R_3,R_4)N^+]X^-$--

UNITED STATES PATENT AND TRADEMARK OFFICE
CERTIFICATE OF CORRECTION

PATENT NO. : 5,344,902

DATED : September 6, 1994

INVENTOR(S) : H. James Harwood et al.

It is certified that error appears in the above-identified patent and that said Letters Patent is hereby corrected as shown below:

Col. 3, line 64, "[($R_1,R_2,R_3$,R4)$N^+$]$X^-$" should be --[($R_1,R_2,R_3,R_4$)$N^+$]$X^-$--

Col 4, line 19, "R4" should be --$R_4$--

Col. 5, line 37, "wherei" should be --wherein--

Col. 6, line 33, "($\leq$0.1) should be --($\leq$0.1)--

Col. 6, line 55, "2,3dichlorobutadiene" should be --2,3-dichlorobutadiene--

Col. 8, line 7, "compounds" should be --compounds:--

Col. 8, line 11, after "esters," insert --arylaralkyl esters,--

Col. 8, lines 11, 12, after "ethers" (second occurrence in patent and application) delete "alkyl aryl ethers,"

Col. 8, line 28, "dimethylacrylamide," should be --dimethylmethacrylamide,--

Col. 9, line 1, "tertbutylperoxyisopropylcarbonate," should be --tert-butylperoxyisopropylcarbonate,--

Col. 9, line 5, tertbuylcumylperoxide" should be --tert-butylcumylperoxide--

Col. 9, line 7, "azo-bisisobutyronitrile" should be --azo-bis-isobutyronitrile--

UNITED STATES PATENT AND TRADEMARK OFFICE
CERTIFICATE OF CORRECTION

PATENT NO. : 5,344,902

DATED : September 6, 1994

INVENTOR(S) : H. James Harwood et al.

It is certified that error appears in the above-identified patent and that said Letters Patent is hereby corrected as shown below:

Col. 11, line 66, "1.2 x $10^4$" should be --1.2 x $10^{-4}$--

Col. 12, line 10, "0,025" should be --0.025--

Col. 12, line 10, "5.2 x $10^{-10}$" should be --5.2 x $10^{-5}$--

Col. 12, line 23, "0,040 should be --0.040--

Col. 12, line 67, "0,010" should be --0.010--

Col. 13, line 2, after "hours." delete "cl"

Col. 13, line 2, "EXAMPLE XII should be centered on a separate line.

Col. 13, line 52, "MMA 0 055" should be --MMA, 0.055--

Col. 14, line 16, "0,025" should be --0.025--

Col. 14, line 27, "EXAMPLE XXII" should be centered

Col. 14, line 50, "5 - $10^{-5}$ should be --5 x $10^{-5}$--

UNITED STATES PATENT AND TRADEMARK OFFICE
CERTIFICATE OF CORRECTION

PATENT NO. : 5,344,902

DATED : September 6, 1994

INVENTOR(S) : H. James Harwood et al.

It is certified that error appears in the above-identified patent and that said Letters Patent is hereby corrected as shown below:

Col. 14, line 58, "0,005" should be --0.005--

Col. 15, line 16, "misible" should be --miscible--

Col. 15, line 47, "$[(R_1,R_2,R_3,R_4)N^-]X^-$" should be --$[(R_1,R_2,R_3,R_4)N^+]X^-$--

Col. 16, line 5, "$[(R_1,R_2,R_3,R_4)N^{+]X-}$" should be --$[(R_1,R_2,R_3,R_4)N^+]X^-$--

Col. 16, line 18, after "a" insert --polymerizable double bond, an amount of a preformed miscible with said--

Col. 16, line 48, "esthers" should be --ethers--

Col. 17, line 6, "compartibilizing" should be --compatibilizing--

Col. 17, line 8, 9, "dalkyl" should be --dialkyl--

Col. 18, line 2, "diarlkyl" should be --dialkyl--

Signed and Sealed this

Thirtieth Day of May, 1995

Attest:

BRUCE LEHMAN

*Attesting Officer*　　*Commissioner of Patents and Trademarks*

UNITED STATES PATENT AND TRADEMARK OFFICE
CERTIFICATE OF CORRECTION

PATENT NO. : 5,344,902                           Page 1 of 5
DATED     : September 6, 1994
INVENTOR(S) : H. James Harwood, et al.

It is certified that error appears in the above-indentified patent and that said Letters Patent is hereby corrected as shown below:

On title page, item [56] insert the following:

ON PAGE 2 UNDER "OTHER PUBLICATIONS":

lines 5, 6, "Organic and Biological Chemistry 85" should be --J. Am. Chem. Soc., Vol. 85-- line 9, "Organic and Biological Chemistry 87" should be --J. Am. Chem. Soc., Vol. 87-- line 20, "Rabel" should be --Rubel--

ON PAGE 3 UNDER "OTHER PUBLICATIONS"

line 11, after "Abstr.." insert --Vol. 109-- line 11, after "109:135005v" insert --pp. 378-379-- line 18, after "58" insert --No. 6-- line 24, after "72" insert --No. 6-- line 33, "Eurpoean" should be --European--

UNITED STATES PATENT AND TRADEMARK OFFICE
CERTIFICATE OF CORRECTION

PATENT NO. : 5,344,902          Page 2 of 5
DATED      : September 6, 1994
INVENTOR(S): H. James Harwood, et al.

It is certified that error appears in the above-indentified patent and that said Letters Patent is hereby corrected as shown below:

lines 35, 39, Delete "Ghosh and Maity, "Polymerization of Methyl Methacrylate with the Use of Cetyl Trimethyl Ammonium Bromide-Benzoyl Peroxide Combination as the Initiating System." European Polymer Journal, 14, 855-859, 1978."

| | |
|---|---|
| Col. 3, line 18 | "$[(R_1,R_2,R_S,R_4)N^+]X^{31}$" should be --$[(R_1,R_2,R_3,R_4)N^+]X^-$-- |
| Col. 3, line 64 | "$[(R_1,R_2,R_3,R4)N^+]X^-$" should be --$[(R_1,R_2,R_3,R_4)N^-]X^-$-- |
| Col 4, line 19 | "R4" should be --$R_4$-- |
| Col. 5, line 37 | "wherei" should be --wherein-- |
| Col. 6, line 33 | "($\leq$0.1) should be --($\leq$0.1)-- |
| Col. 6, line 55 | "2,3dichlorobutadiene" should be --2,3-dichlorobutadiene-- |
| Col. 8, line 7 | "compounds" should be --compounds:-- |
| Col. 8, line 11 | after "esters," insert --arylaralkyl esters,-- |
| Col. 8, lines 11, 12 | after "ethers" (second occurrence in patent and application) delete "alkyl aryl ethers," |
| Col. 8, line 28 | "dimethylacrylamide," should be --dimethylmethacrylamide,-- |
| Col. 9, line 1 | "tertbutylperoxyisopropylcarbonate," should be --tert-butylperoxyisopropylcarbonate,-- |

UNITED STATES PATENT AND TRADEMARK OFFICE
CERTIFICATE OF CORRECTION

PATENT NO. : 5,344,902    Page 3 of 5
DATED : September 6, 1994
INVENTOR(S) : H. James Harwood et al.

It is certified that error appears in the above-indentified patent and that said Letters Patent is hereby corrected as shown below:

| | |
|---|---|
| Col. 9, line 5 | tertbuylcumylperoxide" should be --tert-butylcumylperoxide-- |
| Col. 9, line 7 | "azo-bisisobutyronitrile" should be --azo-bis-isobutyronitrile-- |
| Col. 11, line 20 | "($\emptyset CH_2CH_3CH_2)_3N^-Cl^-$)" should be --$\emptyset CH_2CH_3CH_2)_3N^+Cl^-$)-- |
| Col. 11, line 57 | ($\emptyset CH_2(CH_3CH_2)_3N^{+C-1}$ should be ($\emptyset CH_2(CH_3CH_2)_3N^+Cl^-$ |
| Col. 11, line 66 | "$1.2 \times 10^4$" should be --$1.2 \times 10^{-4}$-- |
| Col. 12, line 10 | "0,025" should be --0.025-- |
| Col. 12, line 10 | "$5.2 \times 10^{-10}$" should be --$5.2 \times 10^{-5}$-- |
| Col. 12, line 23 | "0,040 should be --0.040-- |
| Col. 12, line 67 | "0,010" should be --0.010-- |
| Col. 13, line 2 | after "hours." delete "cl" |
| Col. 13, line 2 | "EXAMPLE XII should be centered on a separate line. |
| Col. 13, line 52 | "MMA 0 055" should be --MMA, 0.055-- |
| Col. 14, line 16 | "0,025" should be --0.025-- |
| Col. 14, line 27 | "EXAMPLE XXII" should be centered |

UNITED STATES PATENT AND TRADEMARK OFFICE
CERTIFICATE OF CORRECTION

PATENT NO. : 5,344,902
DATED : September 6, 1994
INVENTOR(S) : H. James Harwood et al.

It is certified that error appears in the above-indentified patent and that said Letters Patent is hereby corrected as shown below:

| | |
|---|---|
| Col. 14, line 30 | "(0,001)" should be --(0.0010)-- |
| Col. 14, line 50 | "(0,100" should be --(0.1000-- |
| Col. 14, line 50 | "5 - $10^{-5}$ should be --5 x $10^{-5}$-- |
| Col. 14, line 58 | "0,005" should be --0.005-- |
| Col. 15, line 16 | "misible" should be --miscible-- |
| Col. 15, line 47 | "[$(R_1,R_2,R_3,R_4)N^-$]$X^-$" should be --[$(R_1,R_2,R_3,R_4)N^+$]$X^-$-- |
| Col. 16, line 5 | "[$(R_1,R_2,R_3,R_4)N^{+]X-}$" should be --[$(R_1,R_2,R_3,R_4)N^+$]$X^-$-- |
| Col. 16, line 18 | after "a" insert --polymerizable double bond, an amount of a preformed miscible with said-- |
| Col. 16, line 48 | "esthers" should be --ethers-- |
| Col. 17, line 6 | "compartibilizing" should be --compatibilizing-- |

UNITED STATES PATENT AND TRADEMARK OFFICE
CERTIFICATE OF CORRECTION

PATENT NO. : 5,344,902

DATED : September 6, 1994

INVENTOR(S) : H. James Harwood et al.

It is certified that error appears in the above-indentified patent and that said Letters Patent is hereby corrected as shown below:

Col. 17, line 8, 9     "dalkyl" should be --dialkyl--

Col. 18, line 2     "diarlkyl" should be --dialkyl--

This certificate supersedes Certificate of Correction issued May 30, 1995.

Signed and Sealed this

Tenth Day of October, 1995

Attest:

BRUCE LEHMAN

Attesting Officer     Commissioner of Patents and Trademarks